July 22, 1924.
B. P. WAGNER
COOKING UTENSIL
Filed Dec. 21, 1922
1,502,073
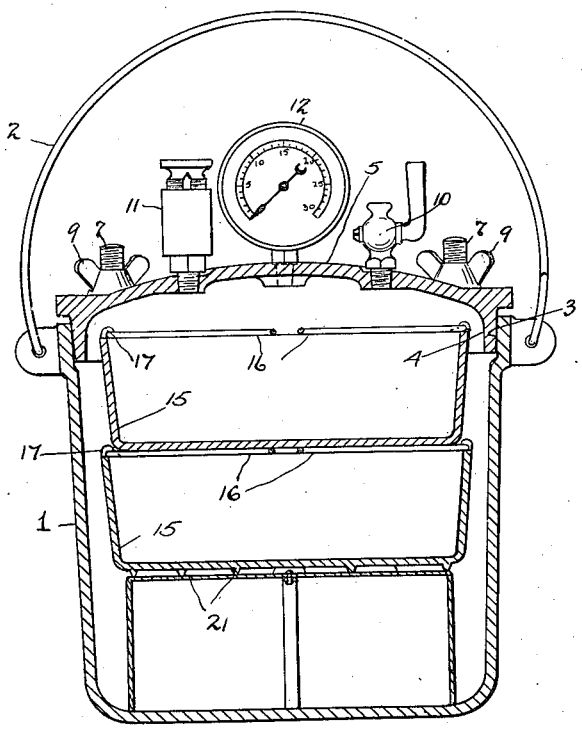
Fig. 1
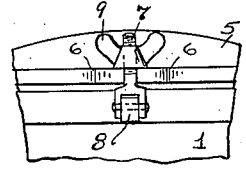
Fig. 3
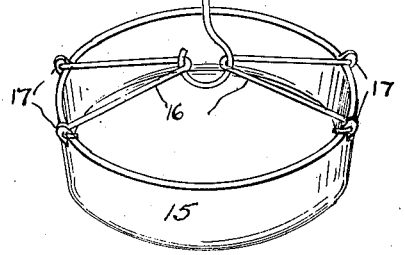
Fig. 4
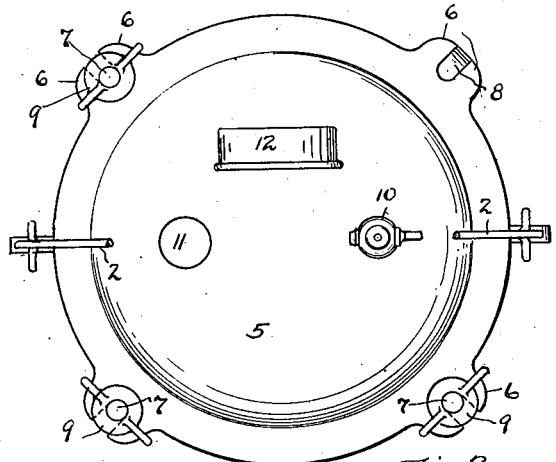
Fig. 2 / Fig. 5
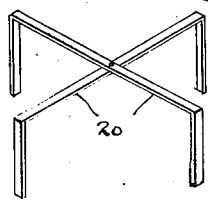
Fig. 6
INVENTOR.
Bernard P. Wagner
BY
Fay, Oberlin & Fay
ATTORNEYS Patented July 22, 1924.

1,502,073

UNITED STATES PATENT OFFICE.

BERNARD P. WAGNER, OF SIDNEY, OHIO, ASSIGNOR TO THE WAGNER MANUFACTURING COMPANY, OF SIDNEY, OHIO, A CORPORATION OF OHIO.

COOKING UTENSIL.

Application filed December 21, 1922. Serial No. 608,313.

*To all whom it may concern:*

Be it known that I, BERNARD P. WAGNER, a citizen of the United States, and a resident of Sidney, county of Shelby, and State of Ohio, have invented a new and useful Improvement in Cooking Utensils, of which the following is a specification, the principle of the invention being herein explained, and the best mode in which I have contemplated applying that principle so as to distinguish it from other inventions.

The utensil in hand is of the type known as a steam pressure cooker wherein food, such as meats, vegetables, fruits and the like, may be placed with the proper amount of water to generate steam within the cooker which is adapted to be tightly sealed so that such steam may be maintained at a predetermined pressure. The advantages of cooking by this method, as also the utility of such an apparatus for canning purposes, need not be elaborated. The object of the present invention is to provide a utensil or apparatus of the type in question which will be simple and compact and capable of being tightly sealed. Provision is also made for the inclusion within the main receptacle, wherein the steam is thus generated and maintained under pressure, of a plurality of separate containers or pans in which different foods can be placed and cooked at the same time. These pans are of special construction and are provided with bails of novel design whereby they may be supported one above the other, as well as readily removed when occasion demands.

To the accomplishment of the foregoing and related ends, the invention, then, consists of the means hereinafter fully described and particularly pointed out in the claims, the annexed drawing and the following description setting forth in detail certain mechanism embodying the invention, such disclosed means constituting, however, but one of various mechanical forms in which the principle of the invention may be used.

In said annexed drawing:—

Fig. 1 is a central vertical section of my improved utensil, showing same as fitted with two pans such as hereinbefore referred to; Fig. 2 is a top plan view of such utensil; Fig. 3 is a broken side elevation of a detail; Fig. 4 is a perspective view showing one of the aforesaid pans, as removed from the utensil, together with a lifting hook whereby such removal is effected; Fig. 5 is a bottom plan view of one of the pans; and Fig. 6 is a perspective view of a device whereby such pan may be supported above the bottom of the utensil.

The main body 1 of the utensil is in the form of a pot-like vessel with substantially cylindrical walls, the latter flaring only slightly. A bail 2 is attached in the usual manner to such pot to facilitate handling of same. At its upper end the pot is provided with a slightly beveled edge 3 adapted to fit a complementary flange 4 on the top or cover 5. The latter is provided with a series (four as shown) of paired lugs 6 between which bolts 7, pivotally attached to projecting lugs 8 on the outside of the pot and provided with wing nuts 9, are adapted to be received. When the bolts are swung into position between lugs 6 and the nuts 9 are tightened, the cover is not only held firmly in place, but the flange 4 forms a tight seal with the mouth or upper end of the pot. Said cover is provided with a vent cock 10, a safety valve 11 and a steam pressure gauge 12.

As best shown in Figs. 1 and 4, the pans 15 with which my improved utensil is equipped are in the form of shallow dishes preferably of metal, as, for example, aluminum, just as the main body or pot 1, such pans being of smaller diameter than the interior of said pot and the latter being of such depth as to take a plurality of pans, three as shown, when the latter are placed directly one above the other. For the purpose of thus supporting one pan directly on another, as well as to facilitate the handling of the individual pans, each of the latter is provided with two bails 16 of the form and construction best shown in Fig. 4. Said bails, in other words, are of approximately triangular form with their ends pivotally secured in outwardly projecting ears 17 on the pan. There will be two such ears for each bail, the pairs being located diametrically opposite each other, and their disposition with respect to the edge of the pan is such that when the bails are turned inwardly, they will rest on such edge and be supported thereby in substantially horizontal position. When thus supported, the inner ends of the bails will not quite meet, but an entirely adequate support is provided thereby for a superposed pan as shown in Fig. 1. Furthermore, the bails are entirely out of the way and at the same time readily accessible when it is desired to lift a pan out of the pot. For the purpose of thus lifting the pans, a handled lifting hook 18 formed out of wire is provided, such hook being adapted to engage the inner ends of the bails when lying in opposed position across the top of the pan (see Fig. 4). When engaged by such hook, the bails swing upwardly sufficiently to obviate all danger of tipping since the pans are then suspended in effect from four points, namely, the four ears 17. It will be understood that due to the shallowness of the pans, with the usual bail, they will tip very easily and spill their contents when being placed in or removed from the cooker. Moreover, by grasping the two bails, one in each hand, the user can, if desired, tilt the pan in order to pour off liquid therefrom without having to grasp the pan itself and without danger of tipping the same too far.

Where meats are being cooked, they are preferably placed directly on the bottom of the pot 1 and if at the same time it is desired to utilize one or more pans, the lowermost thereof is supported above such bottom by means of the device best shown in Fig. 6. Such device consists of two U-shaped bars or members 20, the transverse portions of which are pivotally connected at their midpoints, so that when placed with such transverse portions at approximately right angles, a four legged support is provided, as shown in Fig. 4, for the lowermost pan. When not in use, the two bars composing the device may be collapsed so as to occupy a minimum space. One of the pans 15, with which my cooker is equipped, will desirably be formed on its bottom with a series of concentrically arranged ribs 21, or equivalent drop forming elements, such as described and claimed, for example, in my prior U. S. Letters Patent Nos. 1,370,863, dated March 8, 1921, and 1,409,262, dated March 14, 1922.

When roasting meat placed in the bottom of the cooker, as described above, the support 21 is placed over the meat and the pan, with its bottom provided with such basting feature, is placed on this support. In addition a second pan may be supported on the bails 16 of such first pan, so that three articles can be simultaneously cooked.

If desired, the under surface of the cover 5 may be provided with the basting feature, consisting of ribs or drop forming elements similar to those on the pan shown in Fig. 5, but this is not desirable because the condensed steam drops into the top pan where it is not ordinarily needed.

When the cooker is being used for sterilizing fruit in jars or cans, it will be understood that the pans, etc., are entirely removed from the interior of the pot 1 so as to permit such hot cans or jars to be placed therein and rest directly on the bottom of the pot.

Other modes of applying the principles of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a cooking utensil, the combination with a pot-like vessel provided with a sealing cover; of a plurality of pans adapted to fit in superposed relation within said vessel, said pans being provided with bails pivotally mounted on the pan and being supported by the edge of said pan, when in a substantially horizontal, inwardly extending position, whereby one pan may be thus supported on the other.

2. In a cooking utensil, the combination with a pot-like vessel provided with a sealing cover; of a plurality of pans adapted to fit in superposed relation within said vessel, each pan being provided with oppositely swinging bails pivoted outwardly thereof and adapted to fold across the same with the edges of the pan holding them in approximately horizontal position, whereby one pan may be thus supported on the other.

3. In a cooking utensil, the combination with a pot-like vessel provided with a sealing cover; of a plurality of pans adapted to fit in superposed relation within said vessel, each pan being provided with two oppositely outwardly extending pairs of ears; and bails of general triangular form pivoted to said ears and adapted when folded inwardly to bear against the upper edge of the pan and extend over the top of the pan in approximately horizontal position, whereby one pan may be thus supported on the other through the lever action of the bails.

4. A pan adapted for use in a cooking utensil of the character described, said pan being provided with oppositely swinging bails pivoted outwardly of said pan and adapted to fold across the same into approximately horizontal position with an intermediate portion bearing against the upper edge of said pan.

5. A pan adapted for use in a cooking utensil of the character described, said pan being provided with two oppositely outwardly extending pairs of ears; and two bails of general triangular form pivoted to such respective pairs of ears and adapted when folded inwardly to bear against the upper edge of the pan and extend over the top of the pan in approximately horizontal position.

Signed by me, this 18th day of December, 1922.

BERNARD P. WAGNER.